United States Patent [19]

Kodama et al.

[11] Patent Number: 5,102,636
[45] Date of Patent: Apr. 7, 1992

[54] METHOD OF OPERATION OF A DRY TYPE SIMULTANEOUS DESULFURIZATION AND DEDUSTING APPARATUS

[75] Inventors: Kenzaburo Kodama, Kakogawa; Kenji Kamei, Kobe; Kousuke Yoshida, Matsudo; Katsuya Ishikawa, Kobe; Yukio Kubo, Itami; Takatani Yoshiaki, Kobe, all of Japan

[73] Assignee: Kawasaki Jukogyo Kabushiki Kaisha, Kobe, Japan

[21] Appl. No.: 487,397

[22] Filed: Feb. 28, 1990

[30] Foreign Application Priority Data

Mar. 2, 1989 [JP] Japan .................................. 1-050581
Mar. 30, 1989 [JP] Japan .................................. 1-80974

[51] Int. Cl.$^5$ ........................ C01B 17/16; C01B 31/20
[52] U.S. Cl. .................................................... 423/231
[58] Field of Search ............................................ 423/231

[56] References Cited

U.S. PATENT DOCUMENTS

2,682,444  6/1954  Phillipps .................... 423/231
2,983,573  5/1961  Moore et al. ............... 423/231

FOREIGN PATENT DOCUMENTS

53-18582  1/1960  Japan .
53-37582  4/1978  Japan .................... 423/231

*Primary Examiner*—Gregory A. Heller

[57] ABSTRACT

A dry type simultaneous desulfurization and dedusting method directed to forming moving beds with granulate desulfurizing and dedusting agent containing as the principle composition 5-95 weight % of iron oxide and 95-5 weight % of metallic iron, and contacting these moving beds with the gas containing hydrogen sulfide and dust, thereby simultaneously desulfurizing and dedusting the gas.

3 Claims, 5 Drawing Sheets

METHOD OF OPERATION OF A DRY TYPE SIMULTANEOUS DESULFURIZATION AND DEDUSTING APPARATUS

FIELD OF THE INVENTION AND RELATED ART

The present invention relates to a dry type simultaneous desulfurizing and dedusting method comprising the steps of forming moving beds with desulfurizing and dedusting materials comprised of iron oxide containing metallic iron (reduced iron) component as the component for keeping strength and causing said moving beds to contact with the gas containing hydrogen sulfide and dust thereby simultaneously desulfurizing and dedusting said gas.

The present invention relates to a dry type simultaneous desulfurization and dedusting apparatus and the method of operating the same in which a plurality of stages of moving beds utilizing desulfurizing and dedusting materials in the form of particles are employed, the moving speed of the desulfurizing and dedusting materials in the moving bed in the forward stage is made faster than that of the moving bed in the rearward stage and hot gases containing hydrogen sulfide and dust are caused to pass through these moving beds whereby desulfurization and dedusting of said hot gages may be executed simultaneously.

The moving bed type dedusting apparatus provides a method of dedusting characterized in capability of attaining fine dedusting in the atmosphere under a high temperature.

Another method of absorbing and removing hydrogen sulfide keeping the reducing gas at a high temperature is the dry desulfurizing method by using metallic sulfide or iron oxide in particular. If both methods as above described by combined together, it is possible to attain a dry type desulfurizing and dedusting method of hot gas.

When hot gases containing hydrogen sulfide and dust, such as the gases generated by coal gasification are to be utilized for combined cycle power generation or as the fuel for fused carbonate fuel cell, a majority of dust and hydrogen sulfide contained in said gas has to be removed. According to a prior art, it is normal to cool the gas at one time and purify the same by a wet method. According to this method, however, said gas cooling will cause the thermal efficiency to be reduced. In view of this fact, dry type gas purification technology is currently under development, said technology being characterized in executing desulfurization and dedusting under a hot atmosphere at more than 500 degree C.

Speaking of dry type gas purification technology, as far as desulfurization is concerned, such desulfurization apparatuses are being developed are of fixed bed or fluidized bed type employing as desulfurization agent the powder or particle form of metallic oxide or of a honey comb with metallic oxided supported thereon. Any of these apparatuses is characterized in that the deslulfurization agents are regenerated and repeatedly reused. On the other hand as far as dedusting apparatuses are concerned, granular bed filters empolying filtering material in the form of particles or high temperature filter employing metallic material are being developed.

The granular bed filter provides a method of flowing the gas in the horizontal direction and the filtering material in the vertical direction so that they may cross and contact each other and the dust contained in the gas may be caught by the filtering material to perform dedusting. Normally by applying particles having a grain size in the order of 1-2 mm as the filtering material, dust having a size up to several micron may be removed. The number of the moving bed may be unity. It is to be noted however that if a plurality of moving beds are arranged in series, the moving bed in the forward stage is adapted to remove crude dust with the filtering material flowing at a high speed and the moving bed in the rearward stage is adapted to remove fine dust as the final dedusting with the filtering material flowing at as slow speed. Having finished contact with the gas, the filtering material will be mechanically separated or separated from the dust by air splitting, and recycled again to the top part of the dedusting apparatus. With regard to the parameters of the filtering material, there are not particular limitation in respect of the shape of particles, the surface characteristics of particles and the like. Any materials may be utilized if they are not powdered or abraded within the dedusting apparatus and have a given strength. Normally, such inexpensive material as quartz sand is used. The flowing speed of filtering material is different depending on the dust concentration in the gas, grading of particles, intended dedusting efficiency and the like and normally less than some meters/hour.

Dry type desulfurization is the method of causing the gas to contact with the solid material (desulfuizing agent) capable of absorbing hydrogen sulfide so as to remove the hydrogen sulfide contained in the gas. Metallic oxide is usually utilized as the desulfurizing agent and reacts with the hydrogen sulfide in the manner as described below to cause the oxygen in the oxide to substitute for sulfur, resulting in desulfurization.

$$MO_x + aH_2S + bH_2 \rightarrow MS_y + cH_2O$$

The desulfurizing agent which has been used may be regenerated by oxidization reaction in the following manner and reused repetitively if suitable metallic material and operation condition be selected.

$$MS_y + aO_2 \rightarrow MO_x + bSO_2$$

There are many metallic materials capable of being used for such a purpose. Above all, iron, zinc, and the like are perticularly suitable in consideration of sulfurizing reaction, easy regeneration and so forth. The form of said desulfurizing agent may be a piece of ore itself containing the above-mentioned metal, a molded piece of said ore, said metal carried on other carrier member, and the like. There are various methods of contacting the desulfurizing agent with the gas to be treated, such as a fixed bed, a fluidized bed, a flow bed, and a moving bed can also be used. In case that iron is employed as the metallic material, it is appropriate that the desulfurization reaction take place at the temperature ranging from 400° to 600° C. and the oxidization regeneration take place in the temperature range of 600°-800° C.

As a method of desulfurizing and dedusting the reducing gas containing hydrogen sulfide and dust, such as coal gasification gas, according to a prior art, there is known a method of simultaneously desulfurizing and dedusting in accordance with the following reaction formula as disclosed in the patent Laid-open Publication No. 60-18582, the method comprising the step of passing the coal gasification gas through the bed filled with the desulfurizing and dedusting material containing iron ore in the form of particulate lumps (mainly consisted of $Fe_2O_3$) among porous carrier bodies and simultaneously desulfurizing and dedusting in accordance with the following reaction formula.

$$3Fe_2O_3 + H_2 \rightarrow 2Fe_3O_4 + H_2O \qquad (1)$$

$$Fe_3O_4 + H_2S + H_2 \rightarrow 3FeS + 4H_2O \qquad (2)$$

Also as disclosed in said publication, there is known a method of regenerating iron oxide in accordance with the following reaction formula by supplying oxidizing agent such as air, oxygen or the like to the used beds of desulfurizing and dedusting material.

$$2FeS + 7/2O_2 \rightarrow Fe_2O_3 + 2SO_2 \qquad (3)$$

The applicant of the present invention has already developed and applied for a patent an apparatus adapted to carry out desulfurizatin and dedusting simultaneously of the coal gasification gas as disclosed in the Japanese Patent Laid-open No. 60-18582, the apparatus comprising a reaction column having a desulfurization and dedusting bed, a regeneration column connected to the lower part of said reaction column and a dust separator connected to the lower part of said regeneration column.

SUMMARY OF THE INVENTION

According to the method of dedusting by use of a moving bed, if the filtering materials be abraded, cracked or powdered too much, then dedusting efficiency may be lowered extremely due to dispersion of the powdered filtering material, causing clogging in the screen provided at the down stream of said moving bed and unabling operation to be continued.

And in case of the iron oxide, since it will lose its strength due to volumetric change caused by repetition of desulfurization ⟷ regeneration (due to oxidation reaction) and be powdered, it has been difficult to apply conventional desulfurizing agent mainly containing iron oxide to the process such as a simultaneous desulfurizing and dedusting process by use of a moving bed, said process requiring a certain strength of particulate material.

The present invention has been provided in view of the problem as above described and an object of the present invention is to provide a method of simultaneous desulfurizing and dedusting comprising use of desulfurizing and dedusting material containing iron oxide and metallic iron (reduced iron) wherein the iron oxide functions as the active component while the metallic iron function as the strength keeping component, thereby prolonging the life of said desulfurizing and dedusting material.

In order to attain the object as above described, the method of dry type simultaneous desulfurizing and dedusting according to the present invention is characterized in comprising the steps of forming the moving bed of particulate desulfurizing and dedusting agent mainly containing the iron oxide of 5-95 weight % and the metallic iron of 95-5 weight % and causing said moving bed to contact with the gas containing hydrogen sulfide and dust thereby desulfurizing and dedusting said gas.

When the weight % of the iron oxide contained in the desulfurizing and dedusting material is less than 5, then the strength of said material will be increased while the desulfruizing capability will be decreased, so that the material is not considered to be preferrable. On the other hand, when the weight % of iron oxide exceeds 95, then the desulfurizing and dedusting capability will be preferable but the strength of the material is so small that such desulfurizing and dedusting material is not also preferable.

The desulfurizing and dedusting material according to the present invention is produced by granulating powder iron oxide, sintering the granules and reducing the sintered granules with vapor to generate metallic iron component. Or said desulfurizing and dedusting material may be produced also by classifying particulalrt iron oxide such as crushed lump of matural iron ore and reducing them with vapor to generate metallic iron component.

Fruthermore, the desulfurizing and dedusting material according to the present invention can also be produced by mixing either or both of $SiO_2$, $Al_2O_3$ with powder iron oxide, granulating them, sintering the granules and then reducing the sintered granules with vapor to generate metallic iron component.

The reason for adding $SiO_2$ and/or $Al_2O_3$ is to hold the iron oxide as the basic component which is not subject to reaction and allow it to function in the same way as the metallic iron component for providing strength.

Of the desulfurizing and dedusting material thus produced, the iron oxide functions as the active component, the metallic iron as the component for keeping strength and $SiO_2$, $Al_2O_3$ also as the component for keeping strength.

The steps of granulating, sintering and reducing with vapor will next be explained.

GRANULATING

By using a rolling type granulator or as agitating type granulator, the raw material powder (powder iron oxide proper or the mixture of the powder iron oxide and either or both of $Al_2O_3$ or $SiO_2$) was agitated, and granulated by spraying water thereon whereby granules having the grain sizes of 0.4–2.5 mm were produced.

SINTERING

The granulated raw material was sintered in the air atmosphere by using an electric furnace. The sintering temperature was 700–1,350° C. and the sintering time was 1–8 hours.

REDUCTION WITH VAPOR

The sintered granules were reduced in a fluidized bed type reactor at an atmospheric pressure. The reducing temperature was 450–950° C. and the gas employed was $H_2$ or CO gas diluted with $N_2$ and the density of $H_2$ and CO was 3–40 vol. %. The gas flow was so predetermined that the density of $H_2$ or CO at the outlet of the fluidized bed might not be lower than 90% of the density at the inlet ot the fluidized bed. Reduction was carried out in batch-wise. After the temperature of the fluidized bed was raised to a predetermined temperature lavel in the stream of $N_2$, the reducing gas was caused to flow for a predetermined period of time and then $H_2$ gas was caused again to flow. The reducing time was in the range of 12–150 minutes.

It is preferable in general in respect of separation of dust by moving beds that coarse dust be removed at the forward stages of the moving bed with the dedusting material flowing at a high flowing speed (moving speed) and fine dust be removed as the final dedusting at the rearward stages with the dedusting material flowing at a slow speed. On the other hand as far as desulfurization by moving beds is concerned, it is necessary that the desulfurizing agent and the gas be caused to sufficiently contact with each other with the desulfurizing agent flowing at a slow flowing speed and reacted for desulfurizatin. It is therefore understood that the flowing speed of the dedusting material in the case of dedusting does not match with the flowing speed of the desulfurizing agent in the case of desulfurization.

It is to be noted, however, that since the apparatus for desulfurizsation and dedusting of coal gasification gas as disclosed in the above-cited Patent Laid-open No. 60-18582 has a single layer of the moving bed in the reaction column, it is difficult to attain a most optimum flowing speed for both desulfurization and dedusting.

The present invention has been provided in light of the problems as above described. Accordingly an object of the present invention is to provide a dry type simultaneous desulfurization and dedusting apparatus and a method of operating the same wherein a plurality of stages of moving beds are arranged in the flowing direction of the gas, dedusting is mainly carried out at the forward stage of the moving bed with the desulfurizing and dedusting materials flowing at a high flowing speed (moving speed), and desulfurization is mainly carried out at the rearward stage of the moving bed with the desulfurizing and dedusting materials flowing at a slow flowing speed.

In order to attain the object as above mentioned, the dry type simultaneous desulfurization and dedusting apparatus is so constructed that a plurality of stages of moving beds utilizing particulate desulfurizing and dedusting materials are provided, these moving beds are so adjustable that the forward stage of the respective moving beds has higher flowing speeds (moving speed) of the desulfurizing and dedusting materials and the forward stage of the moving bed is served as the bed for mainly dedusting while the rearward stage of the moving bed is served as the bed for mainly desulfurizing and independent discharge means are provided at the lower part of the moving beds of the respective stages.

The appropriate flowing speed of the gas and the desulfurizing agent at the time of desulfurization in the moving beds being different depending on the condition of operation, it is preferrable as mentioned earlier that the flowing speed of the gas and the desulfurizing agent is slower (longer residence time) than in the case of dedusting at the moving beds. The flowing speed of the gas is reduced to enhance desulfurization of the gas. However, in order to reduce the flowing speed of the gas, the sectional area of the passage for the gas has to be made corresponding by larger, resulting in enlargement of the relevant apparatus for a given volume of treating gas. It is more economical for the desulfurizing agent to be regenerated by increasing the content of sulfur more than a certain level. However, if the moving speed of the desulfurizing agent be made slow so as to enhance sulfurization reaction efficiency, then the dust contained in the moving beds will be increased if the dust concentration in the gas is high and the ventilation pressure loss through the moving beds will be too much. In this case, it is necessary to regenerate the desulfurizing agent after recycling for several times without reducing the moving speed.

It is theoretically possible to simultaneously carry out dedusting and desulfurization in a dry mode by using moving beds as above described. However, the operational conditions of dedusting and desulfurization do not match each other but are limiting to each other. It is therefore important to select the most optimum operational conditions in terms of performance, efficiency and economy to both dedusting and desulfurization. It should also be understood that dedusting and desulfurization are not performed with a constant load and independent load fluctuation for both operation must be allowed. According to the present invention, in order to carry out both dedusting and desulfurization efficiently, a plurality of moving beds have been employed, the forward group of moving beds serving mainly for dedusting and the rearward group of the moving beds serving mainly for desulfurization.

In the forward stages of the moving beds, the flow rate of the desulfurizating and dedusting material is set to be as large as possible so long as the pressure loss through the beds does not increase and the required dedusting efficiency is maintained. This permits the required dedusting effect to be attained in the forward stage, while the reaction efficiency of the desulfurizing agent is not so high. On the contrary in the rearward stage of the moving beds, the moving speed of the desulfurizing and dedusting materials is set to be slow so as to attain the expected desulfurization efficiency of the desulfurization agent. Since a majority portion of the dust has already been removed at the forward stage, the pressure loss through the moving bed will not be so high even if the desulfurization and dedusting materials are moved at a slow speed. The flow rate ratio of the filtering material between the forward stage and the rearward stage is suitable if it is 3–20 in case of two stages. It is further possible to devise the rearward stage to be an intermittently moving bed whereby desulfurization takes place in the manner of a fixed bed. The residence time of the gas through the beds should be long enough as the entire stages. The term "moving bed" according to the present invention is intended to include "intermittent moving bed".

Since the present invention is constituted as above explained, the following effects may be expected.

According to the method as claimed in claim 1 of the present invention, the desulfurizing and dedusting material containing the metallic iron (reduced iron) and the iron oxide was used so that the iron oxide functioned as the active component while the metallic iron functioned as the component keeping strength, whereby even if the moving bed is made up of said desulfurizing and dedusting material and cycles of desulfurizing, dedusting and regeneration are repeated, the desulfurizing and dedusting material is not so degraded with consequence of slight reduction in desulfurizing and dedusting function and the serviceable life of the desulfurizing and dedusting meterial may be prolonged.

According to the apparatus as claimed in claim 2, the apparatus may be of a compact and simplified construction and power requirement as well as utility consumption may be reduced by integrally combining the desulfurization section and the dedusting section. Furthermore, a most optimum operational condition in respect of the performance, efficiency and economy of both desulfurization and dedusting may be attained.

According to the apparatus as claimed in claim 3, since the dust concentration at the inlet to the fine dust dedusting section may be reduced extremely, the fine dust dedusting section may be made compact.

According to the method as claimed in claim 4, since the desulfurizing and dedusting materials containing little sulfer may be allowed to perform a high desulfurization performance at the last stage of the moving bed to concentrate sulfur content and regeneration of the desulfurization and dedusting materials may be efficiently performed removing highly concentrated sulfur.

According to the method as claimed in claim 5, the applicable range of load required for desulfurization and dedusting is so wide that even independent fluctuation of desulfurization and dedusting may be complied with.

According to the method as claimed in claim 6, since independent recirculation lines for the desulfurization and dedusting materials are provided for the moving beds mainly for dedusting and the moving beds mainly for desulfurization, separation of dust and regeneration of said materials may be efficiently executed.

DETAILED DESCRIPTION OF THE PREFERRED EMBODIMENTS

Figure 1:
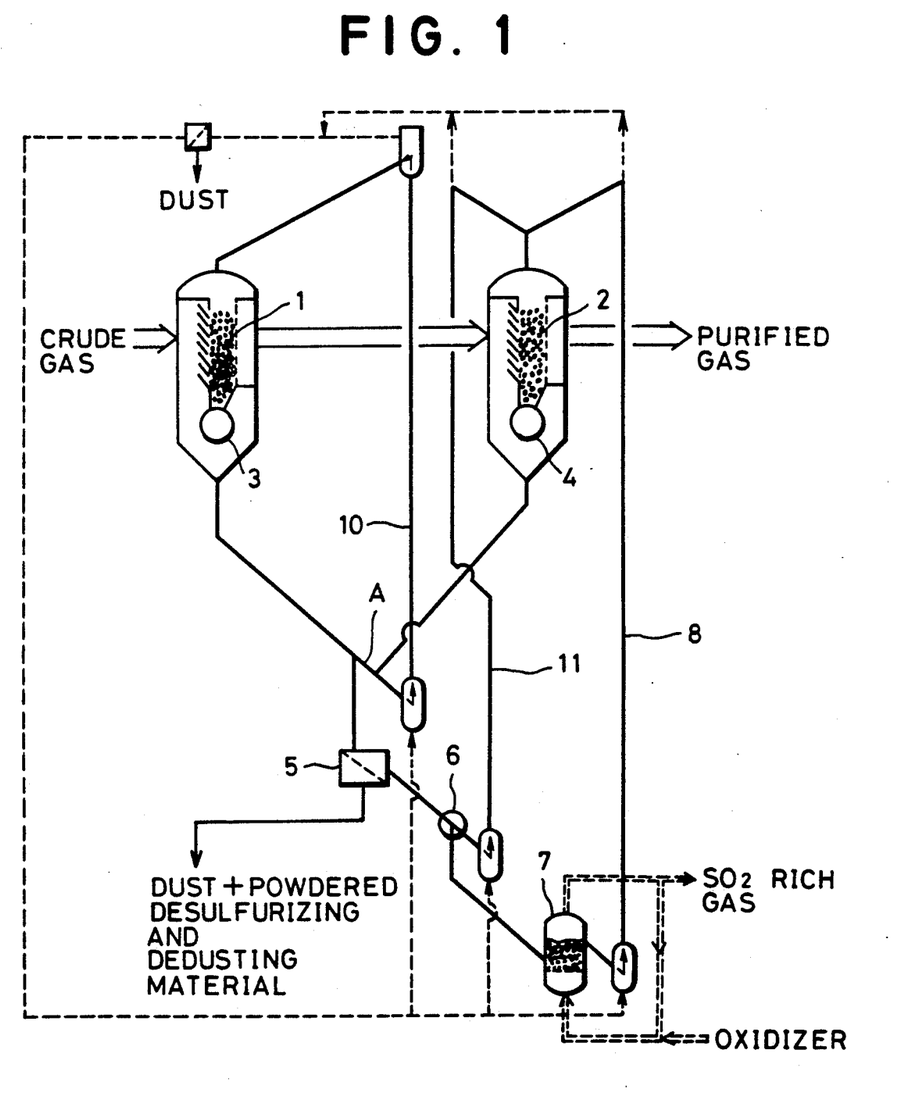
FIG. 1 is the explanatory diagram illustrating an embodiment of the dry type simultaneous desulfurization and dedusting apparatus according to the present invention.

FIG. 1 illustrates an embodiment in which two stages of moving beds are provided. At the lower portion of the first moving bed 1, there is provided a discharging machine 3 such as a roll feeder while at the lower portion of the second moving bed 2, there is provided a discharging machine 4 such as a roll feeder. Said discharging machines 3, 4 are so adjusted that the flowing speed (or moving speed) of the desulfurizing and dedusting materials at the first moving bed 1 is fast and the flowing speed of the desulfurizing and dedusting materials at the second moving bed 2 is slow. Numeral 5 designates a dust separator, numeral 6 a variable means such as a damper or the like, numeral 7 a regeneration, numerals 8, 10 lift pipes and numeral 11 the bypass line for said regenerator. It is to be noted that the dotten line designates the air flow. It is also noted that the regenerator is so constructed that oxidizing agent (or the air containing oxygen) may be supplied thereto.

Figure 3:
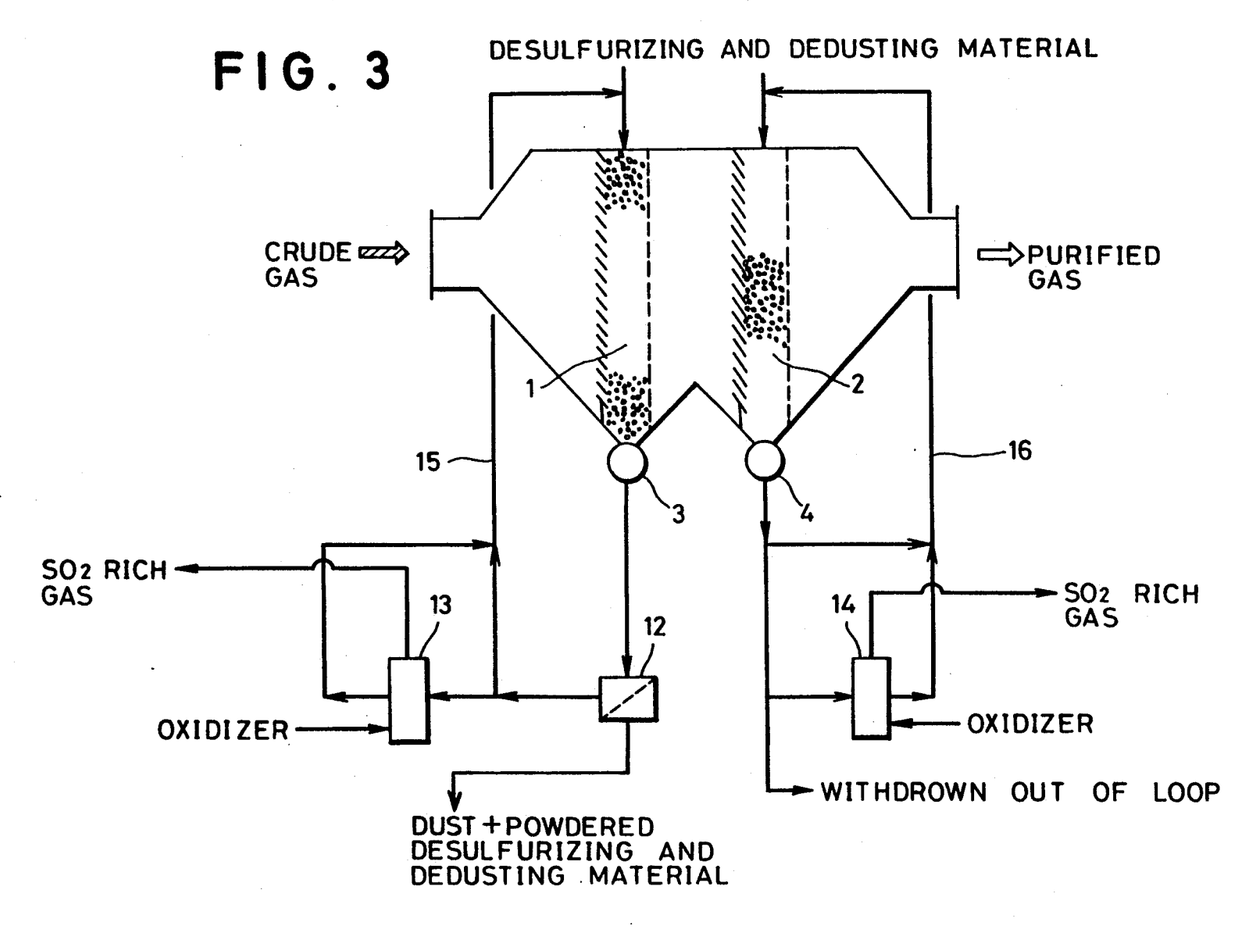

FIG. 1 illustrates the embodiment in which the moving beds provided as two stage arrangement are disposed in separate housings. It is likely conceivable, however, that as shown in FIG. 3, the first moving bed and the second moving beds may be disposed in one housing. In FIG. 3, numeral 12 designates a dust separator, numerals 13, 14 regenerators and numerals 15, 16 recirculation lines.

Figure 2:
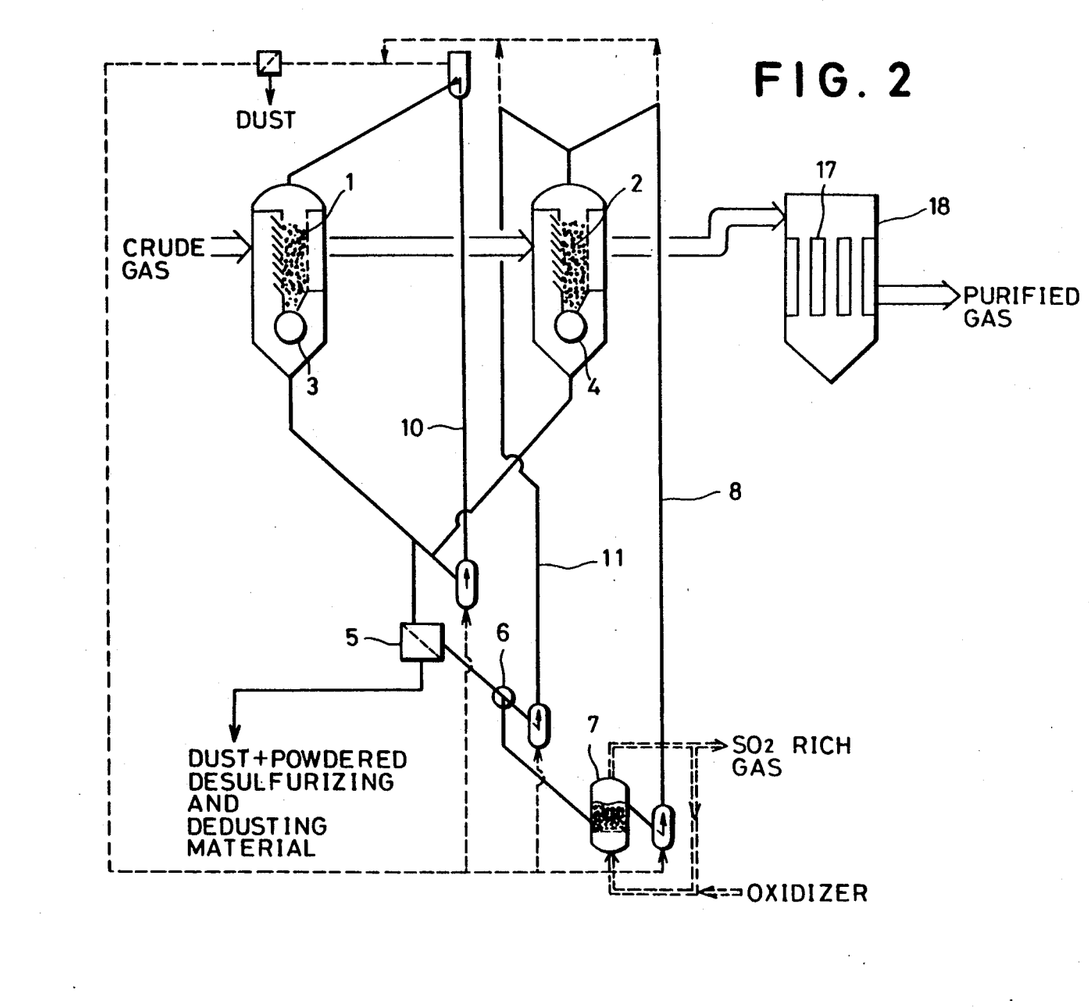
FIGS. 2 through 4 are explanatory diagrams illustrating other embodiments of the apparatuses according to the present invention.
Figure 4:
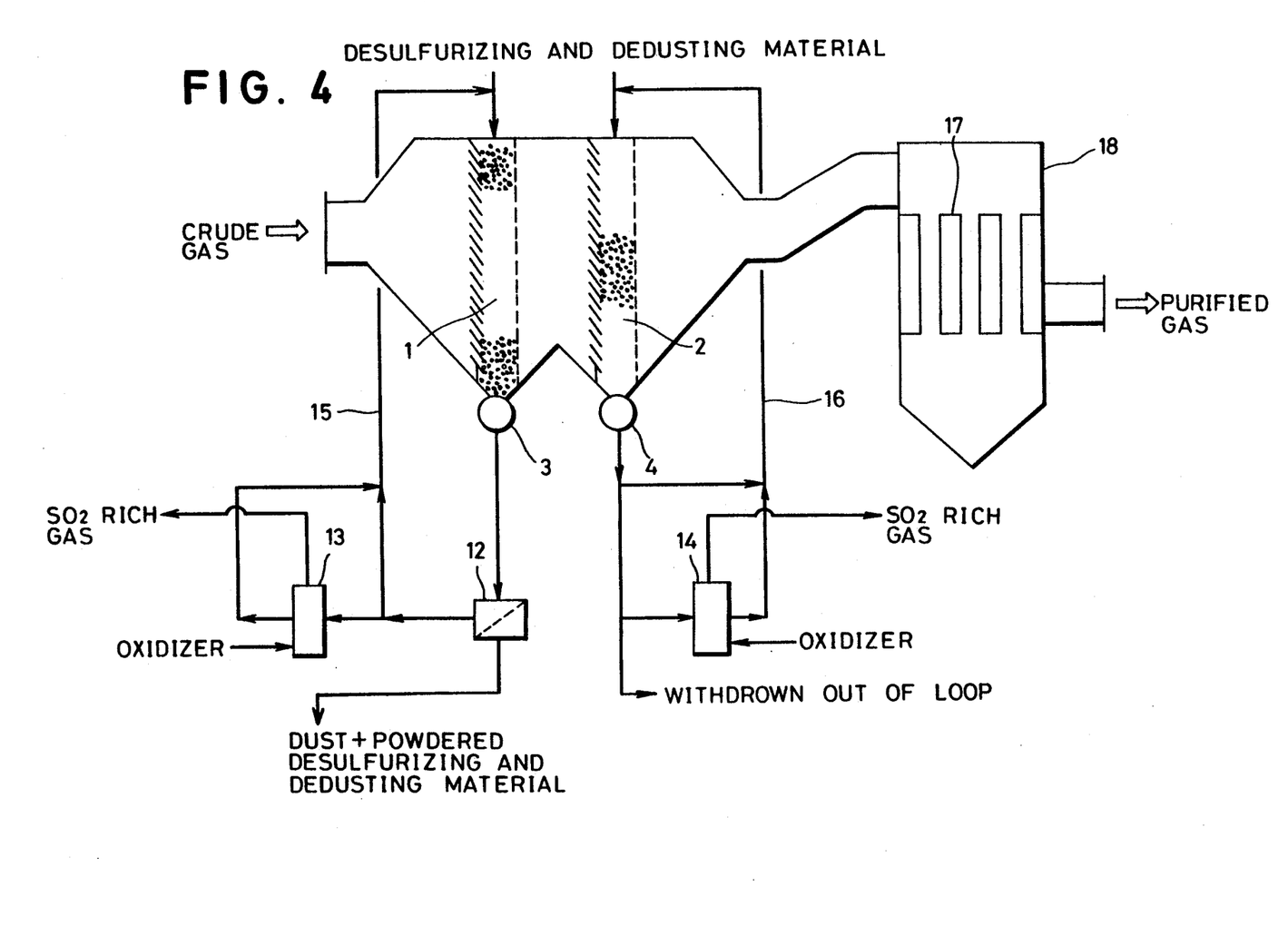

As shown in FIG. 2 and FIG. 4, it is also possible that a fine dust dedusting section 18 incorporating filters 17 composed of ceramic filters, or porous materials such as fabrics may be connected to the down stream side of the dry type simultaneous desulfurization and dedusting apparatus shown in FIG. 1 or FIG. 3. The advantage of this embodiment is that since the dust concentration at the inlet to the fine dust dedusting section 18 is so low that the section 18 may be made compact.

Next, the method of operating the apparatus as claimed in claim 2 (the operational method as claimed in claim 4) will be explained. According to this method, a part of the desulfurizing and dedusting materials which have been used in the moving beds in the previous stages are separated from dust and then it is continuously regenerated. The desulfurizing and dedusting materials thus generated are supplied to the moving bed at the last stage and recirculated to the moving bed at the forward stage to be used therein. The materials then contanining a high sulfur content are withdrawn for regeneration again.

According to the apparatus as claimed in claim 2, the moving speed of the desulfurizing and dedusting materials has to be greatly different at the forward stage and the rearward stage. For this reason, the recirculation system for the desulfurization agent between desulfurization and regeneration has to be independent between the forward stage and the rearward stage or in the case that the recirculation system is integrated, the cycle frequency has to be different between the forward stage and the rearward stage. In consideration of simplifying the relevant apparatus, the operational method as claimed in claim 4 has been proposed wherein the recirculation system is unity and the filtering material capable of performing a high degree desulfurization is recirculated.

Desulfurization performance of the desulfurizing agent will be degraded as desulfurization proceeds. It is preferable therefore that the movable bed serving mainly for desulfurization should use fresh desulfurizing agent which is less sulfurized. On the other hand, if the more sulfurized desulfurizing agent will be regenerated, the more efficiently it will be regenerated. It is also to be noted that in case regeneration will be executed under a high temperature atomosphere like the iron based desulfurizing agent, it will be heated up to a preferable temperature range owing to regeneration (oxidization) reaction heat without applying external heating source if the sulfurization rate is in excess of a certain level. In case of the iron base desulfurizing agent, if the sulfur concentration is more than 3% during desulfurization, the required temperature level may be attained without supplying heat from the external sources.

According to the method as claimed in claim 4, out of a plurality of moving beds, the forward moving bed which is used mainly for dedusting will use the desulfurizing and dedusting materials by recycling them and a part of said materials will be extracted to be sent to the regenerator for regeneration. The regenerated desulfurizing and dedusting materials are all supplied to the rearward moving bed used mainly for desulfurization and used there only once and fed to the forward moving bed used mainly for dedusting. By doing so, high desulfurization may be attained at the rearward moving bed by utilizing fresh desulfurizing and dedusting materials while said desulfurizing and dedusting materials are repetitively used at the forward moving bed until they are heavily sulfurized and then regenerated.

The method according to the present invention will now be explained in more concrete manner by referring to FIG. 1. The gas containing hydrogen sulfide and dust is passed through the first moving bed 1 in which the desulfurizing and dedusting materials are moving at a high flowing speed and treated mainly for dedusting. The desulfurizing and dedusting materials are withdrawn by the discharger 3 at a high speed after they have been used at the first moving bed 1 and a part of the withdrawn desulfurizing and dedusting materials will be supplied to the dust separator 5 wherein the dust and powdered desulfurizing and dedusting materials are separated from the desulfurizing and dedusting materials which will be then introduced to the regenerator 7 for regeneration. The desulfurizing and dedusting materials thus regenerated will be supplied by the lift pipe 8 to the second moving bed 2 where they are caused to move at a slow flowing speed. The gas to be treated is fed from the first moving bed 1 to this second moving bed 2 where desulfurizing is mainly executed. The desulfurizing and dedusting materials are extracted to the discharger 4 at a slow speed after they have been used at the second moving bed 2 and caused to be recirculated to the first moving bed by the lift pipe 10 together with the desulfurizing and dedusting materials which have been extracted from the first moving bed 1 but not introduced to the dust separator 5. In this way, they are more and more sulfurized and when the sulfur content is increase, the desulfurizing and dedusting materials are extracted and regenerated again. Although it is not shown in FIG. 1, a fresh desulfurizing and dedusting supply conduct is connected to the first moving bed 1 or the second moving bed 2.

The method as claimed in claim 5 is to remove dust from a part of the desulfurizing and dedusting materials which have been used in the moving bed at the forward stage in accordance with the method as claimed in claim 4 and further extract a part of the dust separated materials and regenerate it, the rate of the extraction being variable. More specifically, a regenerator by-passing line is provided in the flowing route of the desulfurizing and dedusting materials (the forward stage moving bed→extraction of a part of the desulfurizing and dedusting materials→regenerator→the rearward stage moving bed) and a portion of the desulfurizing agent supplied to the rearward stage moving bed alone will be regenerated.

The above-mentioned method will be explained in more detail by referring to FIG. 1. The desulfurizing and dedusting materials which have been used in the first moving bed 1 are withdrawn by the discharger 3 at a high speed, a part of the materials will be supplied to the dust separator 5 where the dust and the powdered desulfurizing and dedusting materials are separated and then fed to the variable means 6 such as a damper or the like which will extract a part of the materials to the regenerator for regeneration. The portion of the materials which have not been supplied to the regenerator 7 will be supplied to the second moving bed 2 by means of the regenerator by-passing line 11. The other constitution remains unchanged from that of the method as claimed in claim 4.

The method as claimed in claim 5 being constituted as above described, the following effects may be provided.

(1) When such desulfurizing and dedusting materials which are capable of desulfurizing even if they are fairly heavily surfurized are to be used, they can be used according to the present method up to a high degree of sulfurization without changing the operational condition of the desulfurizing and dedusting beds and then regenerated.

(2) When the change in the desulfurizing load (such as the change in the density of hydrogen sulfide in the gas) is experienced, regeneration for the materials with a constant rate of sulfurization may be performed according to the present method without changing the operational condition of the desulfurizating and dedusting bed by altering the rate of the desulfurizing and dedusting materials to be sent for regeneration. Conversely, even if the dedusting load alone be changed independently, this change may be coped with without influence over regeneration of the desulfurizing material.

The method as claimed in claim 6 is to remove the dust from the desulfurising and dedusting materials which have been used in the moving bed at the forward stage and then to recirculate a majority of said materials to the moving bed at the forward stage and regenerate the remaining portion of said materials so as to recirculate the regenerated materials to the moving bed at the forward stage, while a majority of the desulfurizing and dedusting materials which have been used in the moving bed at the rearward stage are recirculated to the moving bed at the rearward stage and a portion of the remaining materials are regenerated so as to be recirculated to the moving bed at the rearward stage, the rest of the materials being discharged out of the loop.

This method will be explained by referring to FIG. 3. The gas containing hydrogen sulfide and dust is passed through the first moving bed 1 in which the desulfurizing and dedusting material is moving at a high flowing speed and treated mainly for dedusting. The desulfurizing and dedusting material which has been used in the first moving bed 1 is withdrawn at a high speed to the discharger 3, supplied to the dust separator 12 so as to be separated from dust and powdered desulfurizing and dedusting materials, and a majority of the material is recirculated to the first moving bed 1, while the rest of the material is supplied to the regenerator 13. After regenerated, the material is recirculated to the first moving bed 1 by way of the recirculation line 15. On the other hand, the desulfurizing and dedusting material which has been used in the second moving bed in which the material is flowing at a slow speed is withdrawn by the discharger 4 at a low speed and a majority of the material is recirculated to the second moving bed by way of the recirculation line 16 while a part of the material is supplied to the regenerator 14 so as to be regenerated and recirculated to the second moving bed 2 by way of the recirculation line 16. The remaining part of the desulfurizing and dedusting material is withdrawn out of the loop so as to be reused or put in disposal.

Figure 5:
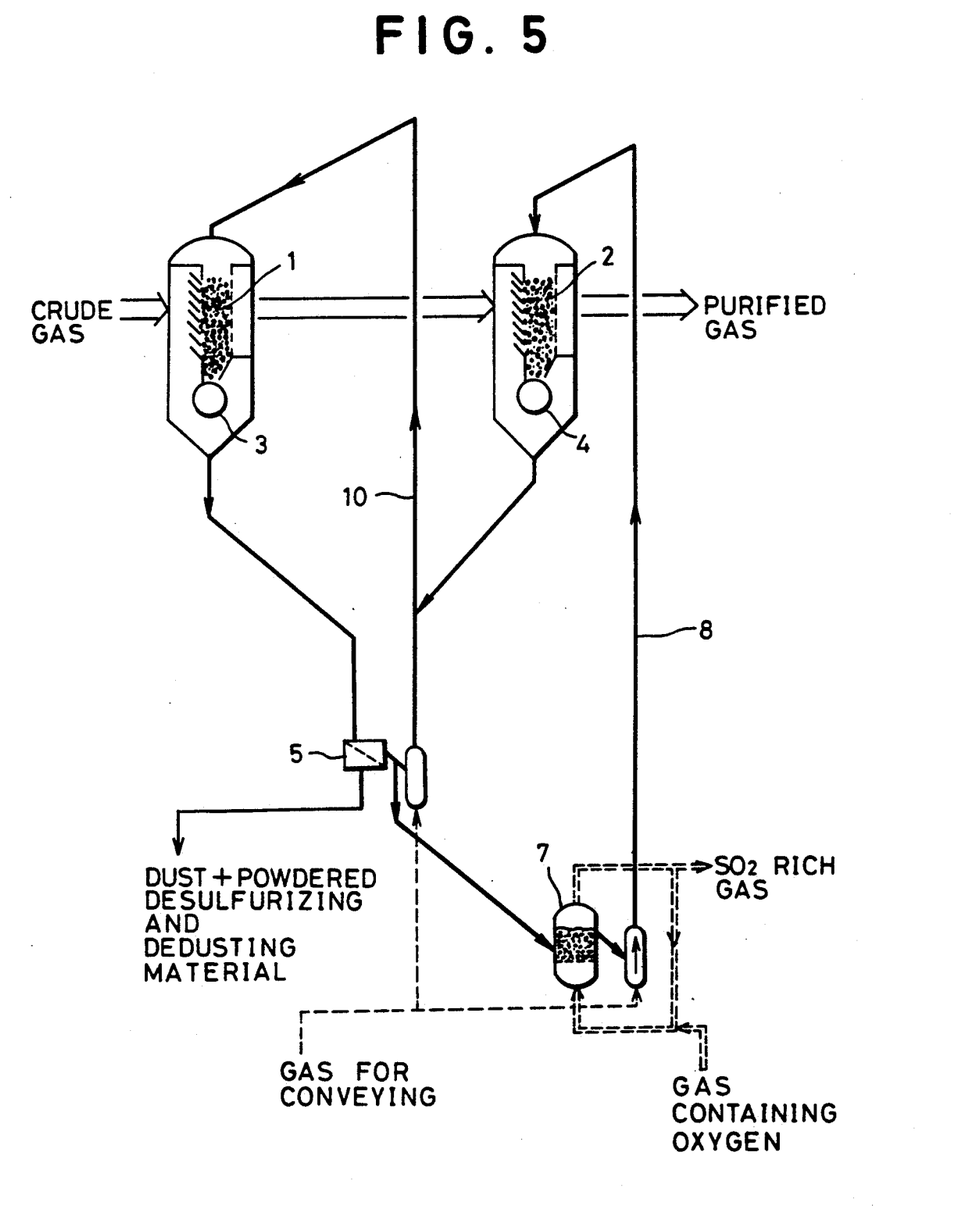
FIG. 5 is the flow sheet illustrating an example of the apparatus adapted to implement the dry type simultenous desulfurizing and dedusting method according to the present invention.

FIG. 5 illustrates an embodiment of the apparatus adapted to implement the method according to the present invention in which the moving bed is comprised of two layers.

The crude gas containing hydrogen sulfide and dust is mainly dedusted in the first moving bed 1 having a faster flowing speed of the gas and mainly desulfurized in the second moving bed 2 having slower flowing speed and discharged as the purified gas. The desulfurizing and dedusting material which has been discharged out of the first moving bed 1 is separated by the dust separator 5 from the dust and the powdered desulfurizing and dedusting material. And then a part of the material is fed to the regeneration 7 to be regenerated. The desulfurizing and dedusting material which has been made active again in the regenerator 7 is forwarded to the second moving bed 2 by way of the lift pipe 8 and then fed to the first moving bed 1. In case the dust content in the gas is high, since it is necessary for the first moving bed 1 to take the desulfurizing and dedusting material by 5-100 times as much as the second moving bed 2, the desulfurizing and dedusting material is recirculated to the first moving bed. Numeral 10 designates the recirculation line, and numerals 3, 4 designate dischargers such as roll feeders. Since independent dischargers 3, 4 are provided in this way at the lower portions of the moving beds of the respective stages, the flowing (moving) speed of the desulfurizing and dedusting material of the respective stages may be adjusted in such a way as the flowing speed at the forward stage may be faster.

Two layers (stages) of moving beds have been explained in connection with FIG. 5. The number of the moving beds, however, must not necesarily be limited to two layers but may be one or more than three.

The following are the embodiments of the present invention.

EMBODIMENT 1

The gas having the following composition was prepared as the testing gas assuming the coal gasification gas and treated by the apparatus as shown in FIG. 1.

$H_2$: 15% (volumetric)
CO: 15% (volumetric)
$CO_2$: 10% (volumetric)
$H_2O$: 10% (volumetric)
$H_2S$: 1500 ppm
Dust: 3 g/$Nm^3$ The desulfurizing temperature in the second moving bed was 500° C., and crushed iron are having grain sized of 1.0-1.41 mm was used as the dedusting material. The desulfurizing and dedusting material was regenerated by being oxidized by 50% air dilution at the temperature of 500° C.

The above-mentioned gas was treated in accordance with the method as claimed in claim 4. 8 weight percent of the desulfurizing and dedusting material which was recirculated through the first moving bed was extracted and supplied to the second moving bed. The material balance of the gas and the desulfurizing and dedusting material were as shown in Table 1 and Table 2. The concentration of the hydrogen sulfide in the gas outgoing from the outlet of the second moving bed was found to be lowered down to 100 ppm. On the other hand, the dust content in the gas at the outlet of the second moving bed was reduced to 3 mg/$Nm^3$ and the dedusting efficiency was 99.9%.

TABLE 1

| Location | Gas Flow Rate ($Nm^3$/hr) | $H_2S$ Concentration (ppm) |
| --- | --- | --- |
| Entrance to 1st moving bed | 1000 | 1500 |
| Entrance to 2nd moving bed | 1000 | 1030 |
| Outlet of 2nd moving bed | 1000 | 100 |

TABLE 2

| Location | Desulfurizing and dedusting material Flow Rate (Kg/nr) | FeS Concentration (wt %) |
| --- | --- | --- |
| Entrance to 2nd moving bed | 80 | 0 |
| Outlet of 2nd moving bed | 80 | 4.7 |
| Entrance to 1st moving bed | 1000 | 6.8 |

TABLE 2-continued

| Location | Desulfurizing and dedusting material Flow Rate (Kg/nr) | FeS Concentration (wt %) |
| --- | --- | --- |
| Return to 1st moving bed | 920 | 7.0 |
| Regenerator Bypassing Line | — | — |
| Entrance to Regenerator | 80 | 7.0 |

It is to be understood that the term "Return to 1st Moving Bed" as used in Table 1 means the portion of the material which has been withdrawn from the first moving bed but not supplied to the dust separator or the portion designated by "A" in FIG. 1.

EMBODIMENT 2

The gas haivng the following composition was prepared as the testing gas assuming the coal gasification gas and treated by the apparatus as shown in FIG. 1.

$H_2$: 15% (volumetric)
CO: 15% (volumetric)
$CO_2$: 10% (volumetric)
$H_2O$: 10% (volumetric)
$H_2S$: 3000 ppm
Dust: 3 g/$Hm^3$ The above-mentioned gas was treated by the apparatus as shown in FIG. 1 in accordance with the method as claimed in claim 5. It is to be noted that the desulfurizing temperature, the desulfurizing and dedusting material and the condition of regeneration were all same as those used in Embodiment 1. 75 weight % of the desulfurizing and dedusting material which was withdrawn from the fist moving bed (8 weight % of the material was withdrawn in the same manner as Embodiment 1) was forwarded to the regenerator for regeneration. The material balance of the gas and the desulfurizing and dedusting material was as shown in Table 3 and Table 4. It was found that the hydrogen sulfide concentration in the gas at the outlet of the second moving bed was reduced to 100 ppm. The dust content in the gas at the outlet of the second moving bed was lowered to 3 mg/$Nm^3$ and the dedusting efficiency was 99.9%.

TABLE 3

| Location | Gas Flow Rate (Nm3/hr) | $H_2S$ Concentration (ppm) |
| --- | --- | --- |
| Entrance to 1st moving bed | 1000 | 3000 |
| Entrance to 2nd moving bed | 1000 | 2030 |
| Outlet of 2nd moving bed | 1000 | 100 |

TABLE 4

| Location | Desulfurizing and dedusting material Flow Rate (Kg/nr) | FeS Concentration (wt %) |
| --- | --- | --- |
| Entrance to 2nd moving bed | 80 | 5.8 |
| Outlet of 2nd moving bed | 80 | 15.3 |
| Entrance to 1st moving bed | 1000 | 19.6 |
| Return to 1st moving bed | 920 | 20.0 |
| Regenerator Bypassing Line | 20 | 20.0 |

TABLE 4-continued

| Location | Desulfurizing and dedusting material | |
|---|---|---|
| | Flow Rate (Kg/nr) | FeS Concentration (wt %) |
| Entrance to Regenerator | 60 | 20.0 |

EMBODIMENT 3

Hot coal gasification gas produced by the coal gasification furnace containing hydrogen sulfide of 1200 ppm and dust content of 3000 mg/Nm³ was treated by the apparatus as shown in FIG. 2 without cooling. A ceramic filter was employed as a filter made of porous material. The gas at the outlet of the second moving fed contained hydrogen sulfide of 20 ppm and dust of 100 mg/Nm³. This gas was introduced to the fine dust dedusting section. As the result, the gas outgoing from the outlet of said five dust dedusting section contained hydrogen sulfide of 20 ppm and the dust content was reduced to 0.1 ppm. This purified gas was supplied to a gas turbine for use therein. Similar result was also obtained by using the apparatus as shown in FIG. 4.

EMBODIMENT 4

The coal gasification gas having the following composition was purified by using the apparatus having the flow as shown in FIG. 5.

Gas Composition
- $H_2S$: 1400 ppm
- $H_2$: 18 volumetric %
- CO: 22—do—
- $CO_2$: 13—do—
- $H_2O$: 10—do—
- $N_2$: 37—do—
- Dust Content: 2.6 g/Nm³

The space velocity (SV) was 3500 hr⁻¹.

The desulfurizing and dedusting material having the composition as shown in FIG. 5 was used. The crush strength was measured by a compression tester. The principal operating conditions were as follows.

Flowing speed of gas (at moving bed): 10 cm/sec
Moving speed of the desulfurizing and dedusting material:
  1st moving bed 4.8 m/hr
  2nd moving bed 0.2 m/hr
Temperature (in 1st moving bed): 450° C.

Operation was conducted under the above-mentioned condition and the desulfurization and dedusting performance as well as the loss amount of the desulfurizing agent were measured. The result of the measurement is shown in Table 6.

EMBODIMENT 5

Operation was conducted under the similar conditions to those of embodiment 4 by using the desulfurizing and dedusting material having the composition as shown in Table 5. The result of the measurement is shown in Table 6.

COMPARISION 1

The iron ore having the composition shown in FIG. 5 was used as the desulfurizing and dedusting agent and operation was conducted under the similar conditions to those in Embodiment 1. The result of the measurement is shown in Table 6.

TABLE 5

| | Embodiment 4 (Reduced Iron 1) | Embodiment 5 (Reduced Iron 1) | Comparison 1 (Iron Ore) |
|---|---|---|---|
| All Fe Content (Wt %) | 98 | 86 | 64 |
| Metallic Fe (Wt %) | 94 | 47 | 0 |
| Crush Strength (Kg) | 13 | 6 | 3 |

TABLE 6

| | Embodiment 4 (Reduced Iron 1) | Embodiment 5 (Reduced Iron 1) | Comparison 1 (Iron Ore) |
|---|---|---|---|
| Average Desulfurization Rate (%) | 88.3 | 94.3 | 95.7 |
| Avarage Dedusting Rate (%) | 99.8 | 98.2 | 78.2 |
| Loss of Desulfurizing and Dedusting Material (after 10 hr. compared to initial fill) | <0.1% | 0.3% | 4.3% |

It is to be understood that the average desulfurization rate, and the average dedusting rate in Table 6 shown the average rate during normal 10 hr. operation. In case of Comparison 1, the air passage resistance at the moving bed itself and the screen at the down-stream of the moving bed is increased gradually, resulting in inability of continuous operation more than 12 hours. As it is seen from the foregoing description, desulfurization performance was not reduced so much and regeneration could be executed positively by using metallic iron (reduced iron) as the desulfurizing and dedusting agent could also be prolonged remarkably.

What is claimed:

1. A method of operating of dry type simultaneous desulfurization of hydrogen sulfide and dedusting apparatus which comprises:

forming moving beds with granulate and dedusting materials containing 5-95 weight percent of iron oxide and 95-5 weight percent of reduced iron, and contracting these moving beds with gas containing hydrogen sulfide and dust, thereby simultaneously desulfurizing and dedusting said gas;

regenerating a part of desulfurizing and dedusting materials which has been used in a moving bed at a forward stage, after said regenerated desulfurizing and dedusting material has been separated from dust;

supplying said regenerated desulfurizing and dedusting material in a moving bed at a rearward stage;

then recirculating said regenerated desulfurizing and dedusting material to the moving bed at a forward stage for use therein; and   withdrawing the desulfurizing and dedusting material from the forward moving bed when it is heavily sulfurized for regeneration and reuse.

2. A method of operating a dry type simultaneous desulfurization of hydrogen sulfide and dedusting apparatus as claimed in claim 1, wherein a part of the desulfurizing and dedusting material which has been used in the moving bed at the forward stage is separated from dust and furthermore a part of dust-separated material is withdrawn to be regenerated, the rate of said withdrawing being variable.

3. A method of operating a dry type simultaneous desulfurization of hydrogen sulfide and dedusting apparatus which comprises:

forming moving beds with granulate and dedusting materials containing 5-95 weight percent of iron oxide and 95-5 weight percent of reduced iron, and contacting these moving beds with gas containing hydrogen sulfide and dust, thereby simultaneously desulfurizing and dedusting said gas;

separating from dust a desulfurizing and dedusting material which has been used in a moving bed at a forward stage of the apparatus, recirculating a majority of the desulfurizing and dedusting material separated from dust to the moving bed at the forward stage of the apparatus wherein the remaining part of the desulfurizing and dedusting material is being regenerated and then recirculated to the moving bed of the forward stage; and recirculating a majority of the desulfurizing and dedusting material to a moving bed at the rearward stage, a portion of the remaining part of said desulfurizing and dedusting material being regenerated, and the rest being discharged.

* * * * *

UNITED STATES PATENT AND TRADEMARK OFFICE
CERTIFICATE OF CORRECTION

PATENT NO. : 5,102,636
DATED : April 7, 1992
INVENTOR(S) : Kenzaburo Kodama, et al It is certified that error appears in the above-identified patent and that said Letters Patent is hereby corrected as shown below:

On the Title page, item

[75] Inventors: Kenzaburo Kodama, Kakogawa; Kenji Kamei, Kobe; Kousuke Yoshida, Matsudo; Katsuya Ishikawa, Kobe; Yukio Kubo, Itami; Yoshiaki Takatani, Kobe, all of Japan Signed and Sealed this Seventeenth Day of August, 1993

Attest:

BRUCE LEHMAN

Attesting Officer

Commissioner of Patents and Trademarks